UNITED STATES PATENT OFFICE.

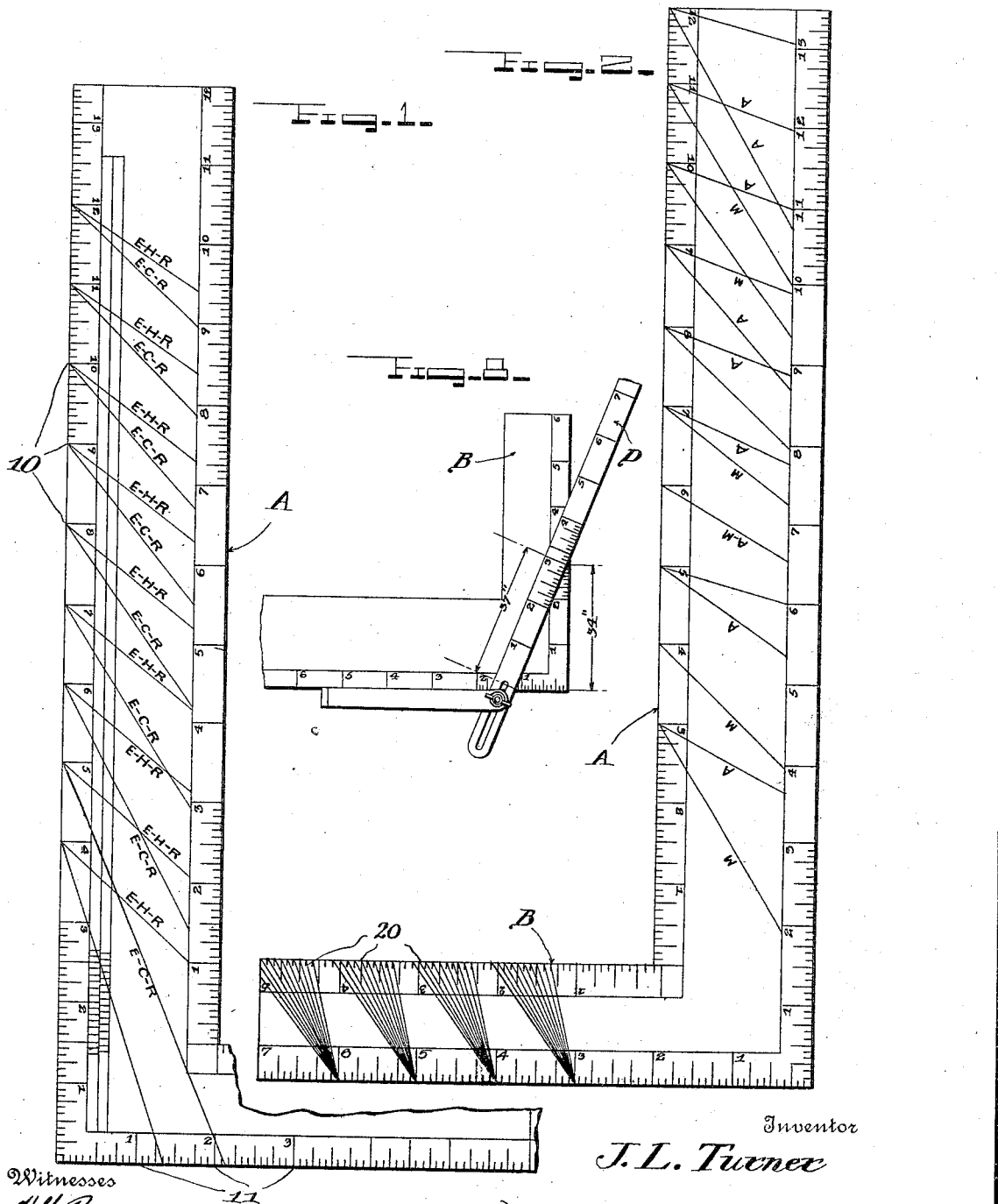

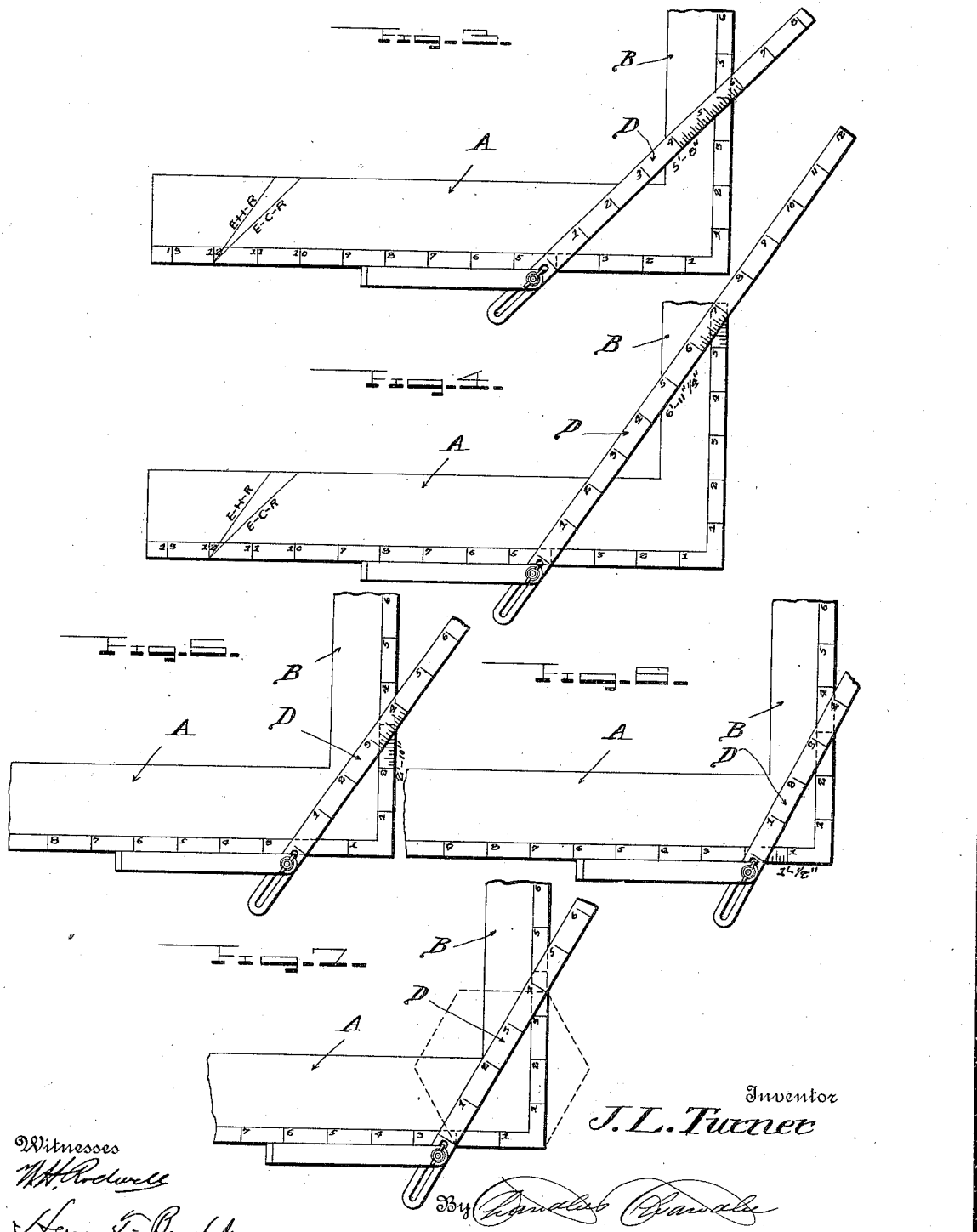

JOHN L. TURNER, OF ST. LOUIS, MISSOURI.

FRAMING-SQUARE.

1,179,778.  Specification of Letters Patent.  Patented Apr. 18, 1916.

Application filed August 17, 1911. Serial No. 644,558.

*To all whom it may concern:*

Be it known that I, JOHN L. TURNER, a citizen of the United States, residing at St. Louis, State of Missouri, have invented certain new and useful Improvements in Framing-Squares; and I do hereby declare the following to be a full, clear, and exact description of the invention, such as will enable others skilled in the art to which it appertains to make and use the same.

This invention relates to framing squares.

The object of the invention resides in the provision of a carpenter's square adapted to be used in association with an ordinary carpenter's bevel to determine the lengths and cuts of hip, jack and common rafters of roof structure and in also forming polygons.

A further object of the invention resides in the provision of a square of the character named having its tongue and blade provided with certain scales and markings whereby same may be used in association with an ordinary carpenter's bevel to determine the lengths and cuts of the rafters of a roof structure without committing to memory a vast array of figures or resorting to the usual mathematical steps to reach the result desired.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a square constructed in accordance with the invention, exposing to view the scales and marks on one side thereof. Fig. 2 a view similar to Fig. 1 looking at the other side of the square and exposing to view other scales and marks thereon. Fig. 3 a view showing the method of utilizing the square in determining the length and cuts of common rafters. Fig. 4 a view showing the method of utilizing the square in determining the lengths and cuts of hip rafters. Fig. 5 a view showing the method of utilizing the square to determine the length and cut of jack rafters. Fig. 6 a view showing the method of utilizing the square to determine the length of a side of a triangle having a given altitude, and Fig. 7 a view showing a method of utilizing the square in determining the length of the sides of a hexagon having a given altitude, and Fig. 8 a view illustrating the method of utilizing the square to frame a hexagonal roof having a one half pitch.

Referring to the drawings, the square is shown as comprising a tongue B and a blade A disposed in the usual relation. The length of the blade A is represented as $13\frac{1}{2}$ inches and the tongue 6 inches, although the length of these portions of the square may be varied at will according to the character of work to be performed. The faces of the blade and tongue shown in Fig. 1 have their outer edges scaled in inches and fractions of an inch, as at 10 and 11 respectively, said scales beginning at the point of intersection of the outer edges of the tongue and blade and increasing toward the free ends thereof respectively. The face of the blade A shown in Fig. 1 is further provided with a plurality of markings formed of pairs of lines each pair converging to a point at one of the inch graduations from the four inch graduation up. The lines of each pair are respectively designated E. C. R. and E. H. R. which designation means "elevation line of common rafters" and "elevation line of hip rafters" and that the line designated E. C. R. in each pair meets the outer edge of the blade at an angle equal to the angle that a common rafter having a given rise per foot meets the horizontal plane while the line designated E. H. R. in each pair meets the outer edge of the blade at an angle equal to the angle that a hip rafter having a given rise per foot meets the horizontal plane. In other words the lines E. C. R. and E. H. R. converging at the 4 inch graduation meet the outer edge of the blade A at the same angles respectively which common and hip rafters having a 4 inch rise per foot run of common rafter meet the horizontal plane. Likewise the lines E. C. R. and E. H. R. converging at the 5 inch graduation, meet the outer edge of the blade A at the same angles respectively, at which common and hip rafters having a 5 inch rise per foot run of common rafter meet the horizontal plane and so on, the number of each inch graduation on the blade A indicating the rise per foot of hip and common rafter which meet the horizontal plane at angles equivalent respectively to the angles formed by lines E. H. R. and E. C. R. with the outer edge of the blade and which lines converge at said graduation.

The faces of the blade and tongue of the square illustrated in Fig. 2 are provided with graduations and markings which will enable the ready determination of the lengths of sides of regular polygons. This end is obtained by providing the inner edges of the faces of the blade and tongue illustrated in Fig. 2 with inch and fraction of an inch graduations, said graduations starting from the point of intersection of the inner edges of said blade and tongue and increasing toward the free end thereof respectively. The face of the blade illustrated in Fig. 2 is provided with additional marking which consists of pairs of lines converging to a point at the inch graduations respectively, beginning at the 3 inch graduation and occurring successively at each inch graduation with the exception of the 4 inch graduation and the 6 inch graduation where only a marking of a single line occurs. The lines on the face of the blade in Fig. 2 which converge at the 3 inch graduation are indicated respectively by M and A meaning miter of an equiangular triangle and angle of an equiangular triangle, likewise the pairs of lines which converge at the other inch graduation are indicated by M and A and bear the same relation to a regular polygon having a number of sides corresponding to the number of the inch graduation at which they converge, as the lines M and A converging at the 3 inch bear to an equiangular triangle. These lines M and A are adapted to be utilized in conjunction with a carpenter's bevel to determine the lengths of sides, altitudes and miters of regular polygons of various numbers of sides in the building of various structures.

Referring to Fig. 3 there is illustrated the method of utilizing the markings shown on the faces of the blade and tongue of the square in Fig. 1, to determine the length and cut of common rafters in a roof structure. In this instance it is desired to obtain the lengths and cuts of a common rafter having a twelve inch rise per foot and associate with a roof having a base of 8 feet. To this end a carpenter's bevel D is positioned on the line E. C. R. which runs to the twelve inch graduation on the blade A. After the bevel D is so adjusted it is applied to the blade A at the four inch graduation as shown in Fig. 3 and where the bevel intersects the outer edge of the tongue B is indicated the length of the desired common rafter, which will be five feet eight inches as one inch on the square equals one foot in the work to be produced. The cuts of a common rafter can thus also be easily determined as the angle of the cut is correctly set forth where the bevel D crosses the outer edges of the tongue B and blade A.

In Fig. 4 is shown the method of obtaining the length and cuts of a hip rafter under the same conditions that are set forth with respect to a common rafter in Fig. 3. In the case of a hip rafter the bevel D is applied to the line E. H. R., which runs to the 12 inch graduation on the blade A. When the bevel D is then adjusted it is applied to the blade A at the 4 inch graduation and where the bevel intersects the outer edge of the tongue B is indicated the length of the desired hip rafter which is 6 feet 11 and ¼ inches.

In Fig. 5 is shown the method of obtaining the length and cuts of a jack rafter under the same conditions that are set forth with respect to a common rafter in Fig. 3. In this case the bevel D is applied to the E. H. R. line which runs to the 12 inch graduation on the blade A and then applied to the two inch graduation on the blade A and where the bevel intersects the outer edge of the tongue B is indicated on said tongue the length of a jack rafter located 2 feet from the seat of a hip rafter, the measurement found being 2 feet 10 inches. If under these conditions the bevel is moved to the 3 inch graduation on the blade A the reading on the tongue will indicate the length of a jack rafter located 3 feet from the seat of a hip rafter and in this manner the length and cuts of a jack rafter located any desired distance from the seat of a hip rafter may be obtained.

In Fig. 6 is shown the method of utilizing the markings on the face of the blade A in Fig. 2 to compute the length of a side of an equiangular triangle having a given altitude. In this instance the bevel D is applied to the line A running to the 3 inch graduation and then moved along the blade A until the bevel D intersects the outer edge of the tongue at a graduation equivalent to the given altitude of the triangle. The reading on the blade where the bevel then intersects same indicates one half the length of the side of the triangle desired and it will then be easy to double said reading and to obtain the full length of the side of the triangle.

In Fig. 7 is shown the method of utilizing the markings on the face of the blade A in Fig. 2 to compute the length of the side of a hexagon having a given altitude. In this instance the bevel D is set to the line M at the 6 inch graduation on the blade and then placed to the altitude desired on the tongue B and the reading on the blade indicates the length of the side of the hexagon. The lengths of the sides of other regular polygons having a given altitude may be as easily found through the utilization of the improved square as will be apparent.

The face of the tongue B shown in Fig. 2 is provided with a plurality of markings or lines 20 from the three inch graduation to the end of the tongue. These lines indicate correctly the elevation lines of hip rafters with rises from 3 to 12 inches per foot respectively for roofs having the shape of different polygons. The lines 20 converging at the three inch graduation are the elevation lines of hip rafters for triangular roofs, while the lines converging at the six inch graduation are the elevation lines of hip rafters for a hexagon roof and so on, the elevation lines of each set being properly laid out for different roof rises per foot.

The use of the elevation lines 20 is illustrated in Fig. 8 wherein is disclosed the method of framing a hexagonal roof having an altitude of four feet. This is accomplished by applying the bevel D to the elevation line 20 of a hip rafter for a one half pitch on a hexagon. Now as the length of each side of the hexagon in Fig. 8 is 28 inches then the bevel should be applied as shown to the 14 inch graduation on edge of blade and where the bevel crosses the edge of the tongue will give the length of the desired common rafter which is 34 inches, then noting the reading on the bevel where the latter intersects the tongue will give the length of the desired hip rafters which is 37 inches. The roofs having shapes of the various regular polygons can be similarly framed. It will be noted that in solving this problem the twelfths of an inch division are each read as an inch.

While several methods of utilizing the square have been illustrated and described it will be noted that it will also serve in conjunction with a carpenter's bevel in solving without mathematical computation various other problems that are apt to arise in the construction of building.

What is claimed is:

A carpenter's square having the outer and inner edges of its blade and tongue graduated into equal divisions and numbered in regular order from the meeting point of said edges toward their free ends and further having lines radiating from the inner edge of the blade at certain graduations, said lines meeting the inner edge of the blade at angles respectively equivalent to the angle formed by the sides of a regular polygon having the same number of sides as the number of the graduation from which the lines radiate, and the angle formed by the side and the miter line of such polygon.

In testimony whereof, I affix my signature, in presence of two witnesses.

JOHN L. TURNER.

Witnesses:
W. W. Cox,
M. M. Murphy.

Copies of this patent may be obtained for five cents each, by addressing the "Commissioner of Patents, Washington, D. C."